(12) United States Patent
Seifert et al.

(10) Patent No.: US 9,356,438 B2
(45) Date of Patent: May 31, 2016

(54) WIRE CABLE ASSEMBLY HAVING A TERMINAL WITH AN ENCAPSULATED WIRE END

(71) Applicant: DELPHI TECHNOLOGIES, INC., Troy, MI (US)

(72) Inventors: Kurt Paul Seifert, Cortland, OH (US); Shawn A. Chernushin, Poland, OH (US)

(73) Assignee: Delphi Technologies, Inc., Troy, MI (US)

( * ) Notice: Subject to any disclaimer, the term of this patent is extended or adjusted under 35 U.S.C. 154(b) by 193 days.

(21) Appl. No.: 14/191,563

(22) Filed: Feb. 27, 2014

(65) Prior Publication Data
US 2015/0244159 A1    Aug. 27, 2015

(51) Int. Cl.
*H01R 13/52* (2006.01)
*H02G 15/04* (2006.01)
(Continued)

(52) U.S. Cl.
CPC .................. *H02G 15/04* (2013.01); *H01R 4/72* (2013.01); *H01R 4/625* (2013.01); *H01R 11/12* (2013.01)

(58) Field of Classification Search
CPC ............ H01B 7/00; H01B 7/282; H01R 4/02; H01R 4/029; H01R 4/18; H01R 4/183; H01R 4/72; H01R 4/70; H01R 4/625; H01R 4/62; H01R 11/06; H01R 11/12; H01R 11/28; H01R 13/52; H01R 13/5205; H01R 13/648; H01R 13/40; H02G 15/04; H02G 1/14; B60R 16/02; B60R 439/521; B60R 439/878; B60R 439/587

USPC .......... 439/521, 878, 587, 607.01; 339/213 T, 339/223 R, 275 T; 174/74 R
See application file for complete search history.

(56) References Cited

U.S. PATENT DOCUMENTS 3,656,092 A * 4/1972 Swengel, Sr. .......... H01R 4/723
                                                    439/730
5,118,313 A * 6/1992 Delalle .................... H01R 4/72
                                                    439/730

(Continued)

FOREIGN PATENT DOCUMENTS

EP    2621022 A1    7/2013
JP    2002025647 A  1/2002
JP    2003234144 A * 8/2003

OTHER PUBLICATIONS

Wire Processing_Wire to Wire Sep. 2010.*

(Continued)

*Primary Examiner* — Timothy Thompson
*Assistant Examiner* — Guillermo Egoavil
(74) *Attorney, Agent, or Firm* — Robert J. Myers

(57) ABSTRACT

A wire cable assembly includes a terminal having a termination segment attached to an end of a wire cable, a connection segment configured to attach to a mating terminal, and a transition segment intermediate the termination segment and the connection segment. The transition segment of the terminal has a generally rectangular cross section and a recess defined in at least one distal edge and preferably both distal edges of the transition segment. The recess may alternatively be characterized as a concavity, notch, hollow, or indentation. A sealant is applied to the transition segment and a sleeve encloses at least a portion of the termination segment, the end of the wire cable, and at least a portion of the transition segment. The sealant fills the recess(es) and blocks a leak path between the sleeve and the distal edge. The sleeve may be a section of dual wall heat shrink tubing.

11 Claims, 3 Drawing Sheets

(51) Int. Cl.
*H01R 4/72* (2006.01)
*H01R 4/62* (2006.01)
*H01R 11/12* (2006.01)

(56) References Cited

U.S. PATENT DOCUMENTS

| | | | |
|---|---|---|---|
| 2002/0092841 A1* | 7/2002 | Vetrano | B29C 61/00 219/393 |
| 2013/0072061 A1 | 3/2013 | Morikawa | |
| 2013/0095708 A1 | 4/2013 | Mitose et al. | |
| 2013/0149899 A1* | 6/2013 | Schroll | H01R 9/034 439/607.01 |
| 2013/0303019 A1 | 11/2013 | Ito et al. | |

OTHER PUBLICATIONS

European Search Report for Appl. No. EP 15 15 5456, published Jun. 25, 2015.
Machine Translation of EP 2621022 from German to English published Jul. 31, 2013.

* cited by examiner

WIRE CABLE ASSEMBLY HAVING A TERMINAL WITH AN ENCAPSULATED WIRE END

TECHNICAL FIELD OF THE INVENTION

The invention generally relates to a wire cable assembly, and more particularly relates to a wire cable assembly having a terminal that is encapsulated to seal a joint between a wire cable and the terminal.

BACKGROUND OF THE INVENTION

It may be desirable to encapsulate the end of a wire cable 2 that is attached to an electrical cable terminal 4 as shown in FIG. 1a within a sealant to protect the joint between the wire cable 2 and the terminal 4. It is especially desirable to seal this joint from electrolytes when the wire cable 2 and terminal 4 are made from dissimilar metals, such as aluminum and copper, to prevent galvanic corrosion of the wire 2 or terminal 4.

A known approach to encapsulate the end of the wire cable is to apply a sealant and heat shrink tubing 6 over the joint between the terminal 4 and wire cable 2 as shown in FIG. 1b. Dual wall heat shrink tubing has an outer wall made of a heat shrinkable plastic such as polyolefin and an inner wall made of a thermoplastic adhesive sealant may be used to simplify the application process. When the heat shrink tubing is heated, the thermoplastic adhesive sealant melts on the inner wall melts and the outer wall shrinks to conform to the wire end and the terminal.

However, this approach for encapsulation has a shortcoming when used to encapsulate a wire end on a terminal having a rectangular cross section near the wire/terminal joint. As illustrated in FIG. 1c, when the heat shrink tubing 6 contracts around the terminal 4 and wire cable 2 as it is heated, the outer wall 8 of the heat shrink tubing 6 comes in contact with the distal edges 10 of the terminal 4, extruding the sealant 12 away from the edges 10 and leaving little or no sealant 12 along the edges 10 to bond to the terminal 4. This creates a leak path for fluids containing corrosive electrolytes to access the joint between the terminal 4 and wire cable 2. Therefore, a terminal that can avoid the creation of this leak path is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a wire cable terminal is provided. The wire cable terminal includes: a termination segment that is configured to attach the terminal to an end of a wire cable, a connection segment that is configured to attach to a mating cable terminal and a transition segment that is located intermediate the termination segment and the connection segment. The transition segment has a generally rectangular cross section and defines a recess in at least one its distal edges. The transition segment may define a plurality of recesses, wherein at least one recess in the plurality of recesses is defined in each distal edge. A one recess in the plurality of recesses may longitudinally offset from another recess in the plurality of recesses. The recess may be characterized as having a generally constant radius.

In another embodiment of the present invention, a wire cable assembly is provided. The wire cable assembly includes a wire cable and a wire cable terminal. The wire cable terminal has a termination segment that is attached to an end of the wire cable, a connection segment that is configured to attach to a mating terminal, and a transition segment located intermediate the termination segment and the connection segment. The transition segment has a generally rectangular cross section. A recess is defined in at least one distal edge of the transition segment. The wire cable assembly also includes a sealant applied to at least the transition segment and a sleeve enclosing at least a portion of the termination segment, the end of the wire cable, and at least a portion of the transition segment. The transition segment may define a plurality of recesses and at least one recess in the plurality of recesses may be defined in each distal edge of the transition segment. A portion of the sealant is disposed within the plurality of recesses. The sleeve encloses the plurality of recesses. The sleeve may be formed from a dual wall heat-shrink material. The wire cable assembly may be configured to be used in a motor vehicle.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

A wire cable assembly having is presented herein. The wire cable assembly includes a terminal having recesses in the distal edges filled with a sealant that blocks a leak path between the distal edges and a sleeve covering the distal edges of the terminal.

Figure 1A:
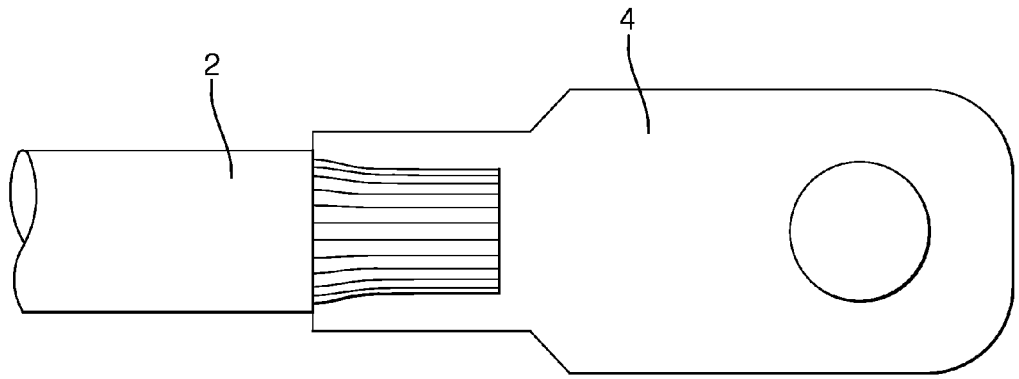
FIG. 1a is top view of a terminal in accordance with the prior art.
Figure 1B:
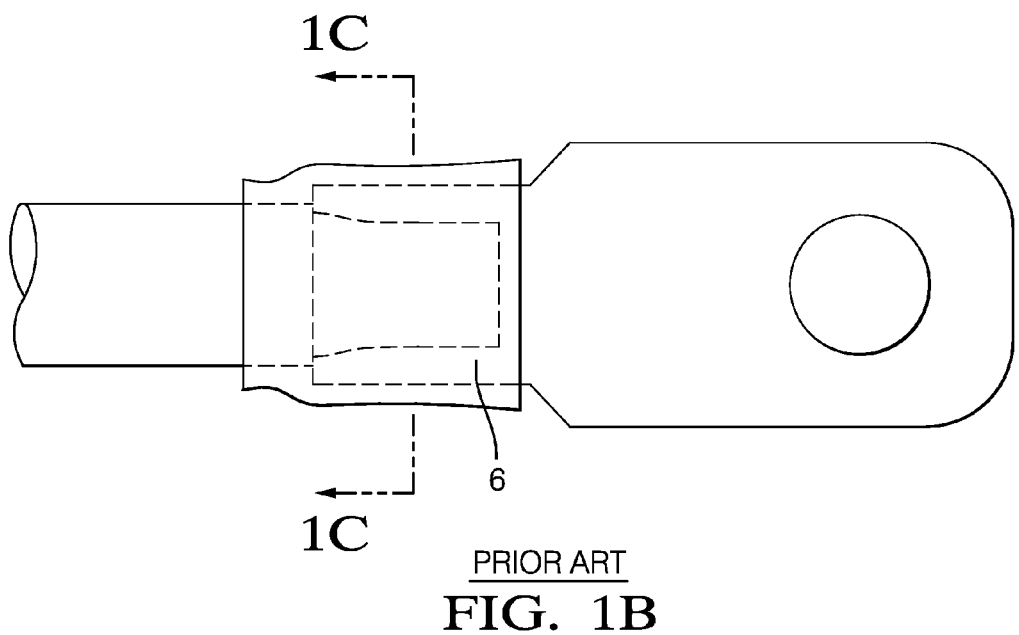
FIG. 1b is a top view of a wire cable assembly including the terminal of FIG. 1a in accordance with the prior art.
Figure 1C:
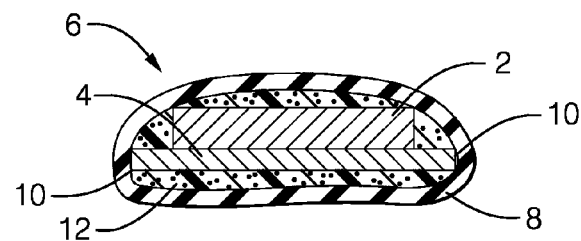
FIG. 1c is a cross sectional view of the wire cable assembly of FIG. 1b in accordance with the prior art.
Figure 2A:
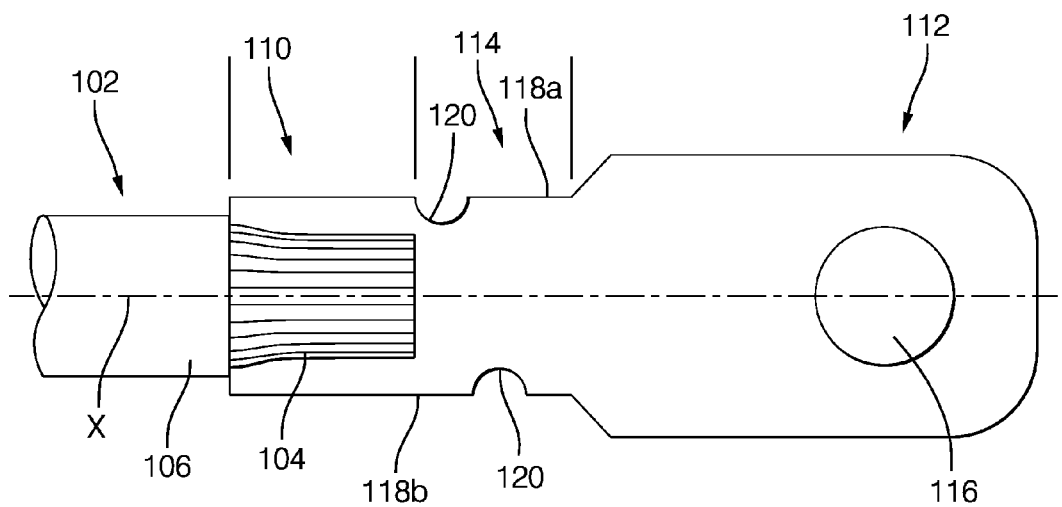
FIG. 2a is top view of a terminal in accordance with one embodiment.

FIG. 2a illustrates a non-limiting example of a partial assembly of a wire cable assembly 100. The wire cable assembly 100 includes a wire cable 102. As illustrated here, the wire cable 102 includes multiple strands of electrically conductive wire 104 that are covered by an insulative cover 106. The wire cable 102 may alternatively have a single wire strand and alternatively may not include an insulative cover. The wire 104 is formed of an electrically conductive material such as copper or aluminum. As used herein, copper may refer to elemental copper or alloys where the major constituent is copper and aluminum may refer to elemental aluminum or alloys where the major constituent is aluminum.

The wire cable assembly 100 illustrated in 2a further includes a terminal 108 having a termination segment 110, a connection segment 112, and a transition segment 114. The termination segment 110 is configured to attach the terminal 108 to an end of the wire 104. As illustrated in FIG. 2a, the end of the wire 104 is compressed and ultrasonically welded to the generally planar termination segment 110. An alternative embodiment of the terminal (not shown) may be envisioned wherein the termination segment defines a hollow tube into which the wire 104 end is inserted and the wire is then soldered to the tube or the tube is crimped to attach the wire cable to the terminal. Yet another alternative embodiment of the terminal (not shown) may be envisioned wherein the termination segment defines crimp wings that may be wrapped about the wire end and crimped to the wire 104 end, thereby attaching the wire cable 102 to the terminal 108. This embodiment may have an additional set of crimp wings that are wrapped about the insulative cover and crimped to secure the terminal to the end the insulative cover, thus inhibiting "pull back" of the insulative cover from the terminal. Other means of attaching an end of a wire cable well known to those skilled in the art may be used to form the termination segment 110.

The connection segment 112 of the terminal 108 is on the end of the terminal opposite the termination segment 110. The connection segment 112 is configured to electrically and mechanically attach the terminal 108 to a corresponding mating terminal (not shown). As illustrated in FIG. 2a, the connection segment 112 defines a hole 116 that may be placed over a mating terminal comprising a threaded stud (not shown) and secured by a nut (not shown). An alternative embodiment of the terminal (not shown) may be envisioned wherein the connection segment includes a male blade or pin, a female receptacle or any other means of attaching the terminal to a mating terminal well known to those skilled in the art.

The transition segment 114 is located intermediate the termination segment 110 and the connection segment 112 and connects the termination segment 110 to the connection segment 112. The transition segment 114 is characterized as having a generally rectangular cross section across the longitudinal axis X of the terminal 108 as illustrated in FIG. 2d and is characterized as having two major surfaces and two minor surfaces wherein the length of the major surface is greater than the length of the minor surface. The length of the major and minor surfaces may alternatively be equal. The minor surfaces form the distal edges 118 of the transition segment 114. The distal edges 118 do not necessarily have sharp edges as illustrated in FIG. 2d, but may also be rounded edges, such as those formed by folding a sheet back onto itself. At least one recess 120 is defined in at least one distal edge 118 of the transition segment 114. The recess 120 may alternatively be characterized as a concavity, a notch, a hollow, or an indentation in the distal edge of the transition segment 114. The transition segment 114 may define a plurality of recesses 120 with at least one recess 120 in the plurality of recesses 120 being defined in each distal edge of transition segment 114. One recess 120 in one distal edge 118a may be longitudinally offset from another recess 120 in the opposite distal edge 118b. This provides the benefit of maximizing the cross section of the transition segment 114, thereby maximizing the mechanical strength and current carrying capability of the terminal 108. The recess 120 may be characterized as rounded or defining an arc having a generally constant radius and a measurement between 45° and 180°. A rounded recess provides the benefit of minimizing stress concentration in the transition segment 114.

Figure 2B:
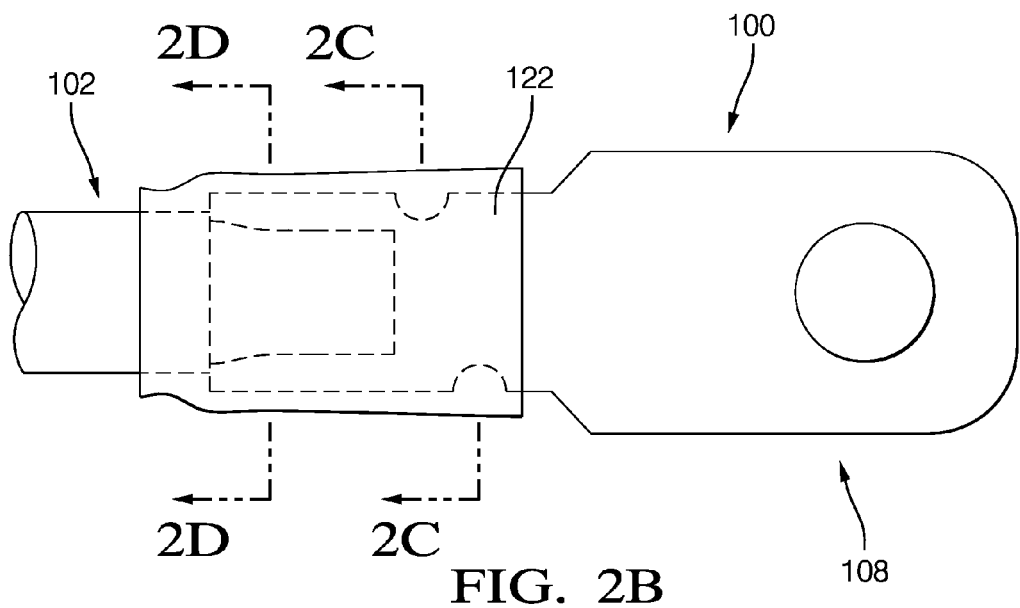
FIG. 2b is a top view of a wire cable assembly including the terminal of FIG. 2a in accordance with one embodiment.
Figure 2C:
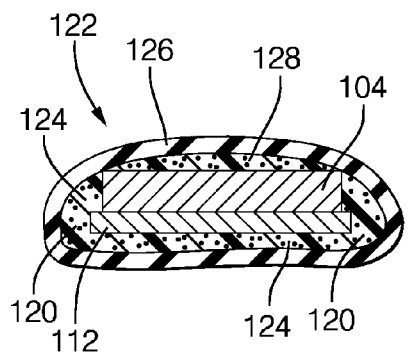
FIG. 2c is a first cross sectional view of the wire cable assembly of FIG. 2b in accordance with one embodiment.
Figure 2D:
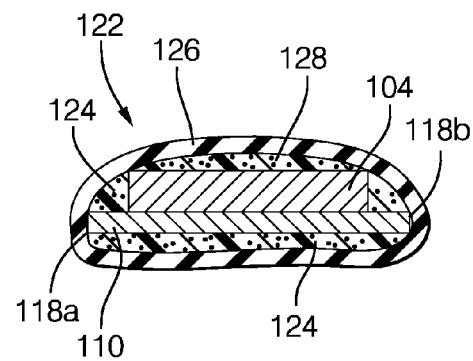
FIG. 2d is a second cross sectional view of the wire cable assembly of FIG. 2b in accordance with one embodiment.
Figure 3:
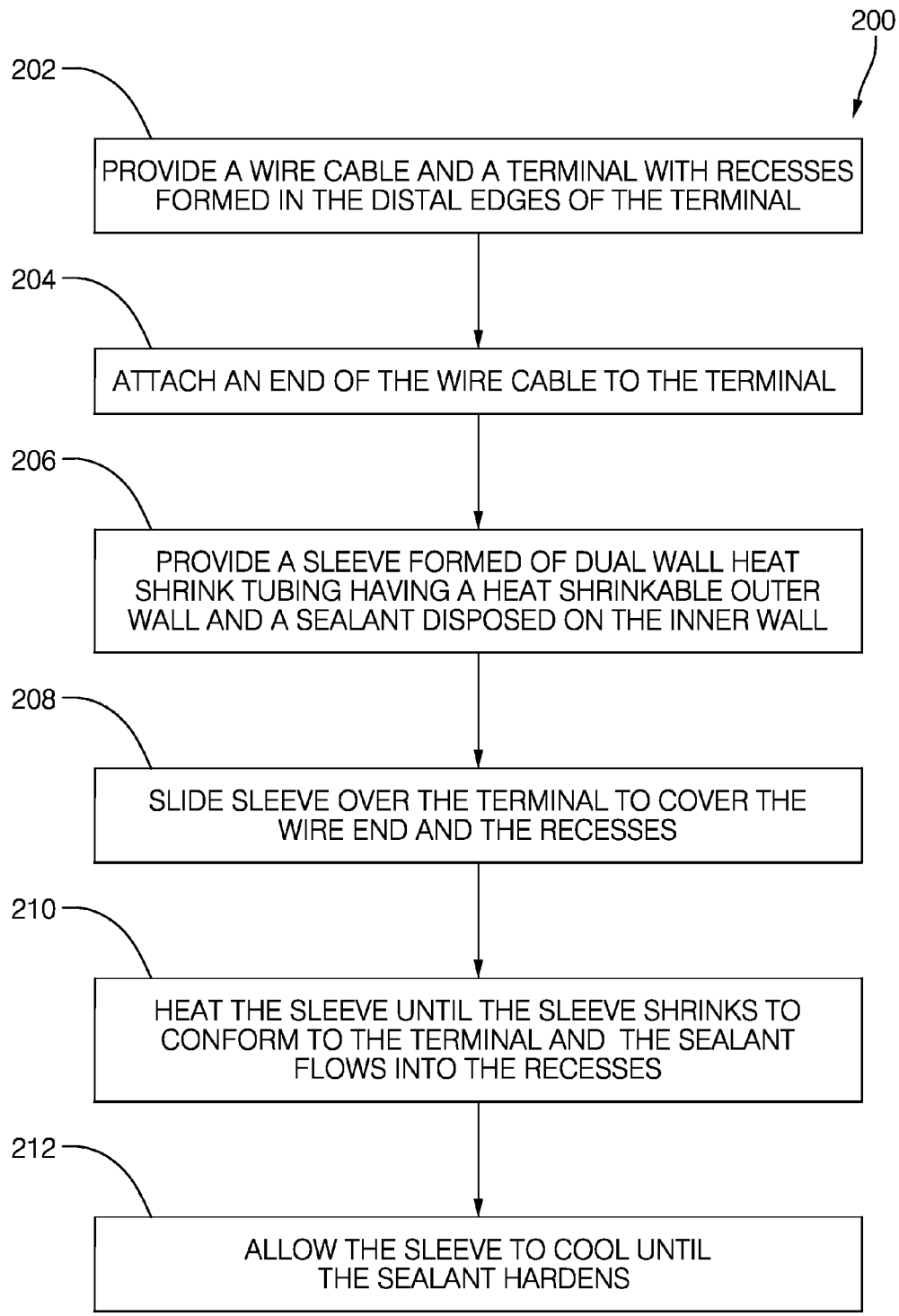
FIG. 3 is flow chart of a method of manufacturing a wire cable assembly in accordance with one embodiment.

As illustrated in FIG. 2b, the wire cable assembly 100 also includes a sleeve 122, such as a segment of heat shrink tubing, that encapsulates or encloses at least a portion of the termination segment 110, the end of the wire cable 102, and at least a portion of the transition segment 114. As illustrated in FIGS. 2c and 2d, a sealant 124 is applied to at least the transition segment 114 and may preferably be applied to the joint between the wire cable 102 and the termination segment 110. The sealant 124, by way of non-limiting examples, may be a thermoplastic adhesive (hot melt glue), a silicone-based sealant, or an epoxy-based sealant. The sealant 124 and the sleeve 122 may be applied separately to the terminal 108 or the sleeve 122 may be a segment of dual wall heat shrink tubing that has an outer wall 126 made of a heat shrinkable plastic such as polyolefin and an inner wall 128 made of a thermoplastic adhesive which acts as the sealant 124. When the dual wall heat shrink tubing is heated, the sealant 124 on the inner wall 128 melts and the outer wall 126 shrinks to conform to the end of the wire 104 end and the terminal 108 and forces a portion of the sealant 124 into the recess 120 in the transition segment 114. The sealant 124 within the recesses 120 forms a barrier to a leak path along the distal edges 118 of the transition segment 114. Dual wall shrink tubing is commercially available from a number of suppliers, including the 3M Company of Saint Paul, Minn.

According to a non-limiting example of a method 200 of manufacturing a wire cable assembly 100, in step 202, PROVIDE A WIRE CABLE AND A TERMINAL WITH RECESSES FORMED IN THE DISTAL EDGES OF THE TERMINAL, a wire cable 102 and a terminal 108 as described above are provided. In step 204, ATTACH AN END OF THE WIRE CABLE TO THE TERMINAL, the insulative cover 106 is stripped from the end of the wire cable 102 and the exposed wire strands 104 are attached, for example by ultrasonically welding the wire stands 104 to the termination segment 110 of the terminal 108. In steps 206, PROVIDE A SLEEVE FORMED OF DUAL WALL HEAT SHRINK TUBING HAVING A HEAT SHRINKABLE OUTER WALL AND A SEALANT DISPOSED ON THE INNER WALL and step 208 SLIDE SLEEVE OVER THE TERMINAL TO COVER THE WIRE END AND THE RECESSES, a sleeve 122 formed of dual wall heat shrink tubing as described above is provided and placed over the terminal 108 so that it at least covers the end of the wire 104 and the recesses 120 in the distal edges 118 of the transition segment 114. In step 210, HEAT THE SLEEVE UNTIL THE SLEEVE SHRINKS TO CONFORM TO THE TERMINAL AND THE SEALANT FLOWS INTO THE RECESSES, the sleeve 122 is heated so that the sealant 124 on the inner wall 128 of the sleeve 122 softens and flows when the outer wall 126 of the sleeve 122 shrinks to conform to the terminal 108 and the end of the wire 104. As the sleeve 122 shrinks, the sealant 124 is pushed away from the distal edges 118 of the transition portion as illustrated in FIG. 2d and into the recesses 120, at least partially filling the recesses 120 as illustrated in FIG. 2c. In step 212, ALLOW THE SLEEVE TO COOL UNTIL THE SEALANT HARDENS, the sleeve 122 is allowed to cool, thus re-hardening the sealant 124. The hardened sealant 124 within the recesses 120 forms a barrier to a leak path along the distal edges 118 of the transition segment 114.

Accordingly, terminal 108 having a recess 120 in the distal edges 118 of the terminal 108, a wire cable assembly 100 including the terminal 108 and a method 200 of manufacturing the wire cable assembly 100 is provided. The recesses 120 in the distal edges 118 of the terminal 108 fill with sealant 124 that is applied to the terminal 108 and blocks a leak path from forming between the sleeve 122 covering a portion of the terminal 108 and the distal edges 118 of the terminal 108 inhibiting the intrusion of electrolyte containing fluids that could corrode the joint between the wire cable and the terminal.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A wire cable assembly, comprising:
   a wire cable;
   a wire cable terminal having
      a termination segment attached to an end of the wire cable,
      a connection segment configured to attach to a mating terminal, and
      a transition segment intermediate the termination segment and the connection segment, said transition segment having a generally rectangular cross section, wherein a recess is defined in at least one distal edge of the transition segment;
   a sealant applied to at least the transition segment; and
   a sleeve enclosing at least a portion of the termination segment, the end of the wire cable, and at least a portion of the transition segment, wherein the transition segment defines a plurality of recesses, wherein at least one recess in the plurality of recesses is defined in each distal edge of the transition segment, and wherein a portion of the sealant is disposed within the plurality of recesses.

2. The wire cable assembly in accordance with claim 1, wherein the sleeve encloses the plurality of recesses.

3. A wire cable assembly, comprising:
   a wire cable;
   a wire cable terminal having
      a termination segment attached to an end of the wire cable,
      a connection segment configured to attach to a mating terminal, and
      a transition segment intermediate the termination segment and the connection segment, said transition segment having a generally rectangular cross section, wherein a recess is defined in at least one distal edge of the transition segment;
   a sealant applied to at least the transition segment; and
   a sleeve enclosing at least a portion of the termination segment, the end of the wire cable, and at least a portion of the transition segment, wherein the transition segment defines a plurality of recesses, wherein at least one recess in the plurality of recesses is defined in each distal edge of the transition segment, and wherein at least a first recess in the plurality of recesses is longitudinally offset from a second recess in the plurality of recesses.

4. The wire cable assembly in accordance with claim 1, wherein the sleeve is formed of a dual wall heat-shrink material.

5. The wire cable assembly in accordance with claim 1, wherein the wire cable is attached to the termination segment using an ultrasonic welding process.

6. The wire cable assembly in accordance with claim 1, wherein the recess is characterized as having a generally constant radius.

7. The wire cable assembly in accordance with claim 1, wherein the wire cable assembly is configured to use in a motor vehicle.

8. The wire cable assembly in accordance with claim 3, wherein the sleeve is formed of a dual wall heat-shrink material.

9. The wire cable assembly in accordance with claim 3, wherein the wire cable is attached to the termination segment using an ultrasonic welding process.

10. The wire cable assembly in accordance with claim 3, wherein the recess is characterized as having a generally constant radius.

11. The wire cable assembly in accordance with claim 3, wherein the wire cable assembly is configured to use in a motor vehicle.

* * * * *